United States Patent
Lee et al.

(10) Patent No.: US 11,252,219 B2
(45) Date of Patent: Feb. 15, 2022

(54) METHOD AND APPARATUS FOR DOWNLOADING A FILE

(71) Applicant: SAMSUNG ELECTRONICS CO., LTD., Suwon-si (KR)

(72) Inventors: Sangjeong Lee, Seoul (KR); Kyung-ah Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/805,937

(22) Filed: Mar. 2, 2020

(65) Prior Publication Data

US 2020/0204610 A1 Jun. 25, 2020

Related U.S. Application Data

(63) Continuation of application No. 14/982,281, filed on Dec. 29, 2015, now Pat. No. 10,581,951.

(30) Foreign Application Priority Data

Feb. 17, 2015 (KR) .................. 10-2015-0024314

(51) Int. Cl.
*H04L 29/08* (2006.01)
*H04L 12/24* (2006.01)

(52) U.S. Cl.
CPC .......... *H04L 67/06* (2013.01); *H04L 41/0836* (2013.01); *H04L 67/1097* (2013.01); *H04L 41/0806* (2013.01)

(58) Field of Classification Search
CPC ............ H04L 41/0806; H04N 21/2665; H04N 21/4622
See application file for complete search history.

(56) References Cited

U.S. PATENT DOCUMENTS

| | | | | |
|---|---|---|---|---|
| 8,239,446 B2* | 8/2012 | Navar | .................... | H04L 67/26 709/203 |
| 8,255,731 B1* | 8/2012 | Alsina | ................ | G06F 11/1458 713/340 |
| 8,553,596 B1* | 10/2013 | Vivanco | .............. | H04L 67/1072 370/310 |
| 8,688,859 B2* | 4/2014 | Vecchio | ............ | H04N 21/2662 709/246 |

(Continued)

FOREIGN PATENT DOCUMENTS

| EP | 3378217 A1 * | 9/2018 | ............ H04W 88/16 |
|---|---|---|---|
| KR | 10-2006-0104310 | 10/2006 | |
| KR | 10-2014-0089461 | 7/2014 | |

OTHER PUBLICATIONS

U.S. Appl. No. 14/982,281, filed Dec. 29, 2015; Lee et al.
Korean Office Action dated Nov. 27, 2020 for KR Application No. 10-2015-0024314.

*Primary Examiner* — Shean Tokuta
(74) *Attorney, Agent, or Firm* — Nixon & Vanderhye P.C.

(57) ABSTRACT

A method of downloading a file to a device includes receiving a request to download one of one or more files stored in a cloud server, confirming whether the requested file is stored in registered devices which are connected through a network, determining priorities of the cloud server and the registered devices which store the requested file, and downloading the requested file from the cloud server and the registered devices which store the requested file, based on the priorities.

13 Claims, 10 Drawing Sheets

(56) References Cited

U.S. PATENT DOCUMENTS

| | | | | |
|---|---|---|---|---|
| 8,726,310 | B2* | 5/2014 | Chang | H04N 21/44016 725/34 |
| 8,776,149 | B1* | 7/2014 | Koch | H04N 21/44222 725/88 |
| 9,100,709 | B1* | 8/2015 | Osminer | H04N 21/466 |
| 9,727,367 | B2* | 8/2017 | Twitchell, Jr. | H04L 41/00 |
| 9,940,335 | B2* | 4/2018 | Kadoda | G06F 16/168 |
| 10,581,951 | B2* | 3/2020 | Lee | H04L 67/1097 |
| 2004/0148344 | A1* | 7/2004 | Navar | H04L 67/06 709/203 |
| 2005/0044229 | A1* | 2/2005 | Brown | H04L 67/322 709/226 |
| 2008/0141317 | A1* | 6/2008 | Radloff | H04N 5/44582 725/87 |
| 2008/0228821 | A1* | 9/2008 | Mick | H04N 21/2541 |
| 2009/0064236 | A1* | 3/2009 | Lee | H04H 60/72 725/62 |
| 2009/0132543 | A1* | 5/2009 | Chatley | G06F 16/185 |
| 2009/0199230 | A1* | 8/2009 | Kumar | G06Q 30/0268 725/32 |
| 2009/0228536 | A1* | 9/2009 | Rauhala | G06F 16/21 |
| 2010/0199311 | A1* | 8/2010 | Chang | H04N 21/4384 725/46 |
| 2010/0199318 | A1* | 8/2010 | Chang | H04N 21/2402 725/97 |
| 2010/0312861 | A1* | 12/2010 | Kolhi | H04L 67/289 709/219 |
| 2011/0023062 | A1* | 1/2011 | Song | H04N 21/47214 725/39 |
| 2011/0082902 | A1* | 4/2011 | Rottler | H04L 65/608 709/204 |
| 2011/0126226 | A1* | 5/2011 | Makhlouf | H04N 21/812 725/32 |
| 2011/0126234 | A1 | 5/2011 | Makhlouf | |
| 2011/0319073 | A1* | 12/2011 | Ekici | H04W 48/18 455/426.1 |
| 2012/0089699 | A1* | 4/2012 | Cholas | G06F 21/10 709/217 |
| 2012/0136851 | A1* | 5/2012 | Yang | G06F 16/9535 707/722 |
| 2012/0166516 | A1* | 6/2012 | Simmons | G06F 16/188 709/202 |
| 2012/0196571 | A1* | 8/2012 | Grkov | H04W 12/126 455/411 |
| 2012/0198020 | A1* | 8/2012 | Parker | H04W 12/08 709/217 |
| 2012/0203796 | A1* | 8/2012 | Abraham | H04W 4/02 707/770 |
| 2012/0302218 | A1* | 11/2012 | Tsuda | H04W 8/18 455/414.1 |
| 2012/0324504 | A1* | 12/2012 | Archer | H04N 21/4751 725/30 |
| 2013/0007208 | A1* | 1/2013 | Tsui | G06F 16/958 709/217 |
| 2013/0028576 | A1* | 1/2013 | Ushimaru | H04N 9/7921 386/326 |
| 2013/0144994 | A1* | 6/2013 | Li | H04L 67/2814 709/220 |
| 2013/0166698 | A1* | 6/2013 | Georgis | H04L 67/104 709/219 |
| 2013/0237204 | A1* | 9/2013 | Buck | G01S 19/34 455/418 |
| 2013/0238751 | A1* | 9/2013 | Raleigh | H04L 67/26 709/217 |
| 2014/0172968 | A1* | 6/2014 | Burba | H04L 67/1008 709/204 |
| 2014/0181301 | A1* | 6/2014 | Yendluri | H04L 67/14 709/225 |
| 2014/0331260 | A1* | 11/2014 | Gratton | H04N 21/4312 725/40 |
| 2014/0344289 | A1* | 11/2014 | Berenson | G06F 16/48 707/751 |
| 2014/0344351 | A1* | 11/2014 | Broz | G06F 9/445 709/204 |
| 2015/0019342 | A1* | 1/2015 | Gupta | G06Q 30/0269 705/14.66 |
| 2015/0039328 | A1* | 2/2015 | MacKenzie | G06Q 20/027 705/2 |
| 2015/0054947 | A1* | 2/2015 | Dawes | G08B 13/19682 348/143 |
| 2015/0189542 | A1* | 7/2015 | Cazanas | H04L 12/189 370/312 |
| 2015/0237077 | A1* | 8/2015 | Suryavanshi | H04L 67/16 709/204 |
| 2015/0271096 | A1* | 9/2015 | Das | G06F 9/5016 709/213 |
| 2015/0334718 | A1* | 11/2015 | Sato | H04W 12/08 370/329 |
| 2015/0350736 | A1* | 12/2015 | Chan | H04N 21/2365 725/93 |
| 2016/0007394 | A1* | 1/2016 | Hassan | H04W 76/12 455/450 |
| 2016/0065647 | A1* | 3/2016 | Venkatesh | H04L 67/108 709/217 |
| 2016/0085753 | A1* | 3/2016 | Wong | G06F 16/951 707/734 |
| 2016/0105718 | A1* | 4/2016 | Xu | H04N 21/4126 725/25 |
| 2016/0134904 | A1* | 5/2016 | Xu | H04N 21/2385 725/116 |
| 2016/0134948 | A1* | 5/2016 | Xu | H04N 21/8133 725/116 |
| 2016/0241630 | A1* | 8/2016 | Lee | H04L 41/0836 |
| 2016/0241907 | A1* | 8/2016 | Pearson | H04N 21/43615 |
| 2016/0337437 | A1* | 11/2016 | Gartsbein | H04L 67/06 |
| 2017/0126584 | A1* | 5/2017 | Das | H04L 47/783 |
| 2019/0379722 | A1 | 12/2019 | Koo et al. | |
| 2020/0204610 | A1* | 6/2020 | Lee | H04L 67/06 |

* cited by examiner

METHOD AND APPARATUS FOR DOWNLOADING A FILE

CROSS-REFERENCE TO RELATED APPLICATION

This application is a Continuation of U.S. application Ser. No. 14/982,281, filed Dec. 29, 2015 (now U.S. Pat. No. 10,581,951), which claims priority to KR 10-2015-0024314, filed Feb. 17, 2015, the entire contents of which are all hereby incorporated herein by reference in their entireties.

BACKGROUND

1. Field

The disclosure relates to methods and apparatuses for downloading a file.

2. Description of Related Art

A digital TV, a computer, a notebook, a cell phone, a tablet, and so on may store a file and reproduce various contents. A user may have a single device or a number of devices.

The user may download a file stored in a cloud server to the device. The cloud server is a storage space connected to a network. The user may download files stored in the cloud server anywhere anytime. The user may download video files from the cloud server and reproduce the downloaded video files to view a video image.

SUMMARY

Methods and apparatuses for downloading a file are provided.

Additional aspects will be set forth in part in the detailed description which follows and, in part, will be apparent from the description.

According to an aspect of an example embodiment, a method of downloading a file in a device may include receiving a request to download one or more files stored in a cloud server, confirming whether the requested file is stored in registered devices which are connected through a network, determining priorities of the cloud server and the registered devices which store the requested file, and downloading the requested file from the cloud server and the registered devices which store the requested file, based on the priorities.

According to an aspect of an example embodiment, the determining of the priorities may include determining the priorities of the cloud server and the registered devices, which store the requested file, in an order based on a time taken to download the requested file (e.g., a shorter download time may correspond to a higher priority).

According to an aspect of an example embodiment, the determining of the priorities may include determining the priorities of the cloud server and the registered devices, which store the requested file, in an order based on a an expense occurring when the requested file is downloaded (e.g., a lower expense may correspond to a higher priority).

According to an aspect of an example embodiment, a method of downloading a file in a device is provided, the method may include confirming files stored in a cloud server and registered devices which are connected through a network, displaying a list of the files and storage locations of the files, selecting one of the files to download and one of the devices from which the file is downloaded, based on an input, and downloading the selected file from the determined device.

According to an aspect of an example embodiment, the displaying may include displaying icons representing the storage locations together with the corresponding files.

According to an aspect of an example embodiment, the displaying may include displaying words representing the storage locations together with file names of the corresponding files.

According to an aspect of an example embodiment, a device to download a file may include a memory, a display, and a processor, wherein the processor is configured to receive a request to download one of one or more files stored in a cloud server, to confirm whether the requested file is stored in registered devices which are connected through a network, to determine priorities of the cloud server and the registered devices which store the requested file, and to download the requested file from the cloud server and the registered devices which store the requested file, based on the determined priorities.

According to an aspect of an example embodiment, the processor may be configured to determine the priorities of the cloud server and the registered devices, which store the requested file, in an order based on a time taken to download the requested file, wherein a shorter download time results in a higher priority.

According to an aspect of an example embodiment, the processor may be configured to determine the priorities of the cloud server and the registered devices, which store the requested file, in an order based on an expense occurring when the requested file is downloaded, wherein a lower expense results in a higher priority.

According to an aspect of an example embodiment, a device to download a file may include a memory, a display, and a processor, wherein the processor is configured to confirm files stored in a cloud server and registered devices which are connected through a network, to control the display to display a list of the files and storage locations of the files, to select one of the files to download and one of the devices from which the file is downloaded, based on an input, and to download the selected file from the determined device.

According to an aspect of an example embodiment, the processor may be configured to control the display to display icons representing the storage locations together with the corresponding files.

According to an aspect of an example embodiment, the processor may be configured to control the display to display words representing the storage locations together with file names of the corresponding files.

According to an aspect of an example embodiment, a computer-readable storage medium may have stored thereon computer-readable codes as a program to execute the method described above or hereinafter.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
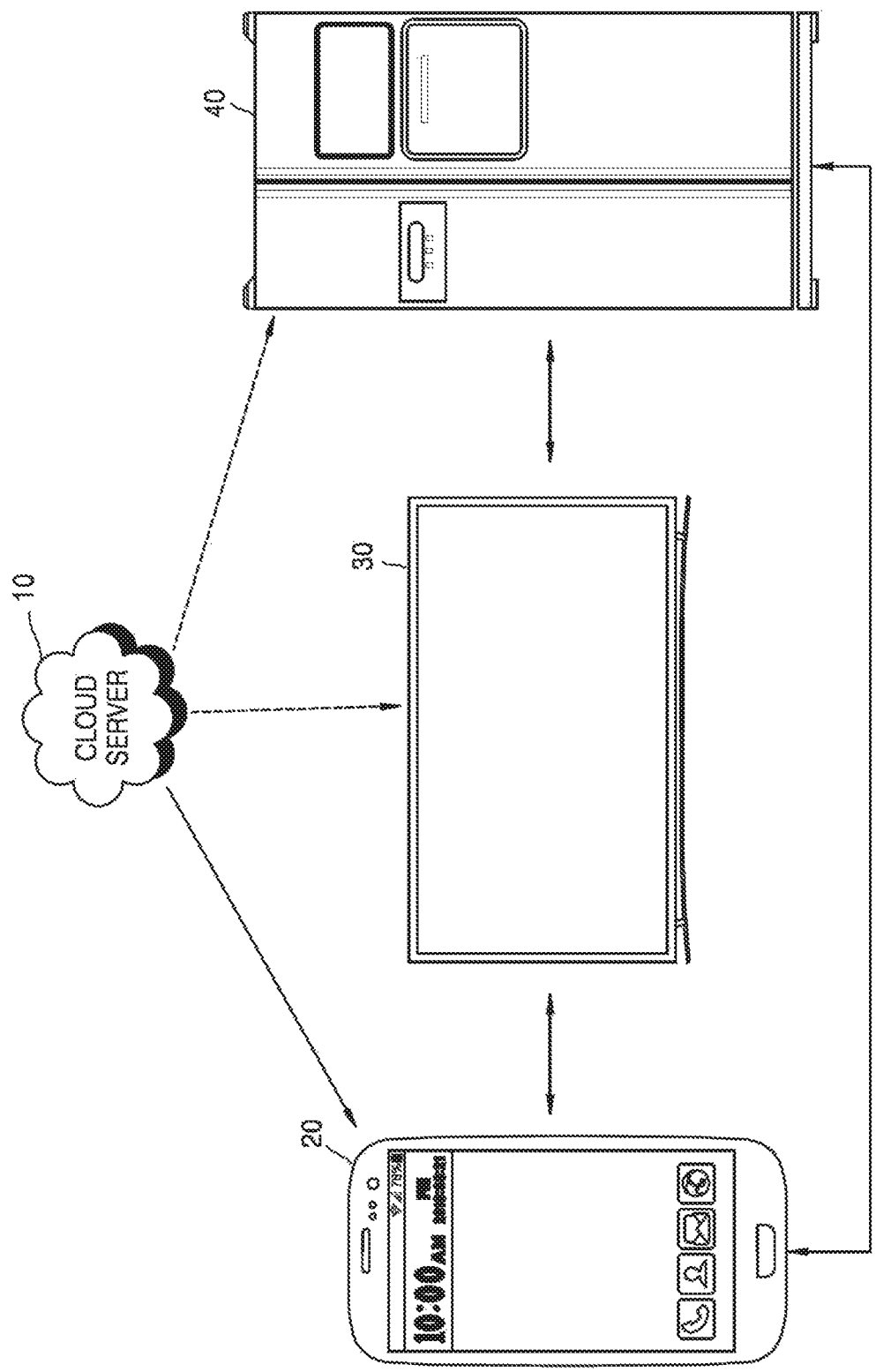
FIG. 1 is a diagram illustrating an example file downloading system.

Reference will now be made in greater detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are simply described below, by referring to the figures, to explain aspects of the disclosure. As used herein, the term "and/or" includes any and all combinations of one or more of the associated listed items. Expressions such as "at least one of," when preceding a list of elements, modify the entire list of elements and may not necessarily modify the individual elements of the list.

FIG. 1 is a diagram illustrating an example file downloading system. Referring to FIG. 1, registered devices (for example, first, second, and/or third registered devices 20, 30, and/or 40) may transmit and receive to and from one another a same file as a file stored in a cloud server 10.

The cloud server 10 may, for example, be a storage connected to the first, second, and third registered devices 20, 30, and 40 according to a wired or wireless communication method. The cloud server 10 may store files. For example, the cloud server 10 may store a video file, an image file, a text file, etc.

The first, second, and third registered devices 20, 30, and 40 may use the files, stored in the cloud server 10, as files stored in corresponding local storages of the first, second, and third registered devices 20, 30, and 40. The first, second, and third registered devices 20, 30, and 40 may access the cloud server 10 and download the files stored in the cloud server 10.

For example, a user may have a cell phone, a TV, and a home appliance (for example, refrigerator) as the first, second, and third registered devices 20, 30, and 40, respectively. The user may download a file from the cloud server 10 using, for example, the cell phone 20 or may download a file from the cloud server 10 using the TV 30. When the user downloads the file using the TV 30, the TV 30 may download the file from the cell phone 20 rather than the cloud server 10. Since the cell phone 20 may have already downloaded the file from the cloud server 10, the TV 30 may download the same file as the file stored in the cloud server 10 from the cell phone 20.

The first, second, and third registered devices 20, 30, and 40 may, for example, be electronic apparatuses that communicate with other devices and apparatus according to a wired or wireless communication method. The first, second, and third registered devices 20, 30, and 40 may each transmit and/or receive a file to and/or from the cloud server 10 or other registered devices 20, 30, and 40. The first, second, and third registered devices 20, 30, and 40 may be connected to a same local network.

The first, second, and third registered devices 20, 30, and 40 may reproduce contents. For example, the first, second, and third registered devices 20, 30, and 40 may reproduce a video image or music or may display a text, or the like. The first, second, and third registered devices 20, 30, and 40 may include, for example, one or more processors, a display apparatus, and a memory, etc.

Figure 2:
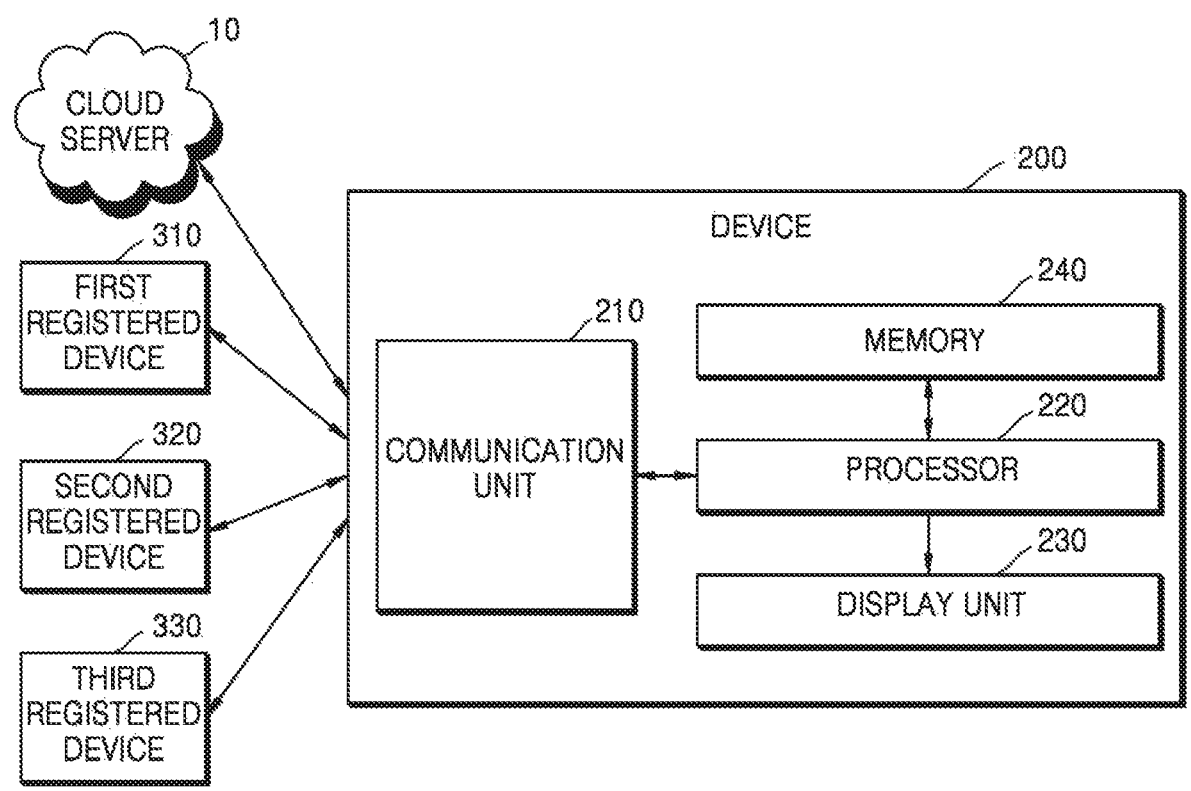
FIG. 2 is a diagram illustrating an example device.

FIG. 2 is a diagram illustrating an example device. Referring to FIG. 2, a device 200 may include a communication unit (e.g., including communication circuitry) 210, a processor (e.g., including processing circuitry) 220, a display unit (e.g., including a display) 230, and a memory 240. The device 200 may download a file that is the same as a file stored in a cloud server 10 through one or more registered devices (for example, first, second, and/or third registered devices 310, 320, and/or 330).

The processor 220 may be configured to receive a request to download at least one of files stored in the cloud server 10. When a user selects the cloud server 10, the processor 220 may be configured to control the display unit 230 to display a list of one or more files stored in the cloud server 10 on a screen of the display unit 230. The processor 220 may be configured to confirm the requested file based on an input received through the display unit 230, for example.

The processor 220 may be configured to confirm whether the requested file is stored in the registered devices 310, 320, and 330 which are connected to a network. The processor 220 may be configured to receive a file list from the registered devices 310, 320, and 330 which are connected to the network, or may communicate with the registered devices 310, 320, and 330 to receive or transmit a message to confirm whether the registered devices 310, 320, and 330 store the requested file. The registered devices 310, 320, and 330 are devices that may be configured to perform data communication with one another by the same user. The registered devices 310, 320, and 330 may, for example, include devices set with a same user identification (same user ID). Accordingly, the registered devices 310, 320, and 330 may communicate with the device 200 without a separate authentication process.

The processor 220 may be configured to determine priorities on the registered devices 310, 320, and 330 and/or the cloud server 10 which store the requested file, and download the requested file from the registered devices 310, 320, and 330 and the cloud server 10 based on the priorities. The processor 220 may be configured to request that a device having a highest priority transmit the requested file to the device 200 without any separate input.

According to an example embodiment, the processor 220 may be configured to determine the priorities of the registered devices 310, 320, and 330 and the cloud server 10 based, for example, on download times taken to download the requested file, for example, from a shortest download time to a longest download time. The processor 220 may be configured to check states of the network, the registered devices 310, 320, and 330, and the cloud server 10. The processor 220 may be configured to determine (or estimate) the download times which are expected to download the requested file from each of the registered devices 310, 320, and 330 and the cloud server 10, and to determine the priorities of the registered devices 310, 320, and 330 and/or the cloud server 10 in order based on the download time, wherein the shorter the download time, the higher the priority.

In another example embodiment, the processor 220 may be configured to determine the priorities of the registered devices 310, 320, and 330 and the cloud server 10 based on expenses occurring when the requested file is downloaded, for example, from a least expensive one to a most expensive one. For example, the first registered device 310 stores the requested file, the first device 310 is connected to the device 200 through, for example, Wi-Fi, and the device 200 is connected to the cloud server 10 through, for example, a 3G network. No cost may occur when the device 200 downloads the requested file from the first registered device 310, and a cost may occur when downloading from the cloud server 10 since the user may, for example, pay a payment to a telecommunications company when the device 200 downloads the requested file from the cloud server 10. Accordingly, the processor 220 may download the requested file from the first registered device 310.

The processor 220 may be configured to confirm files stored in the registered devices 310, 320, and 330 and the cloud server 10 and to control the display unit 230 to display a list of files and locations where the respective files are stored. The processor 220 may be configured to determine one of the files and one of the registered devices 310, 320, and 330 and/or the cloud server 10 from which the file is downloaded, and to download the determined file from the determined device (or server). When two or more of the registered devices, for example, registered devices 310 and 320 store the same file, the processor 220 may be configured to control the display unit 230 to display the two or more registered devices 310 and 320 which store the file and then download the file from one of the two or more registered devices 310 and 320 based on user input. The processor 220 may also be configured to control the display unit 230 to display the registered devices 310, 320, and 330 and the cloud server 10 which store the file, and download the file from one of the registered devices 310, 320, and 330 and the cloud server 10 based on a user input.

According to an example embodiment, the processor 220 may be configured to control the display unit 230 to display icons representing storage locations, in which the files are stored, together with the corresponding files. When, for example, the user touches one icon, the processor 220 may download the file from one device represented by the touched icon. For example, the processor 220 may be configured to control the display unit 230 to display file names together with the icons so that the user selects one device to download the file.

In an example embodiment, the processor 220 may be configured to control the display unit 230 to display the file names together with words representing the storage locations in which the files are stored.

The processor 220 may be configured to control the communication unit 210, the display unit 230, and the memory 240.

The communication unit 210 connects the device 200 to the registered devices 310, 320, and 330 and the cloud server 10 according to a wired or wireless communication method. The communication unit 210 may transmit a file using, for example, 3G, 4G, LTE, WiFi, etc.

The memory 240 stores the files or programs usable in the device 200.

The display unit 230 displays data received from the processor 220. For example, the display unit 230 may display an image or a text.

The display unit 230 may receive a user input. The display unit 230 may, for example, include a touch panel, may detect a touch as the input, and may transmit a location of the touch to the processor 220.

Figure 3:
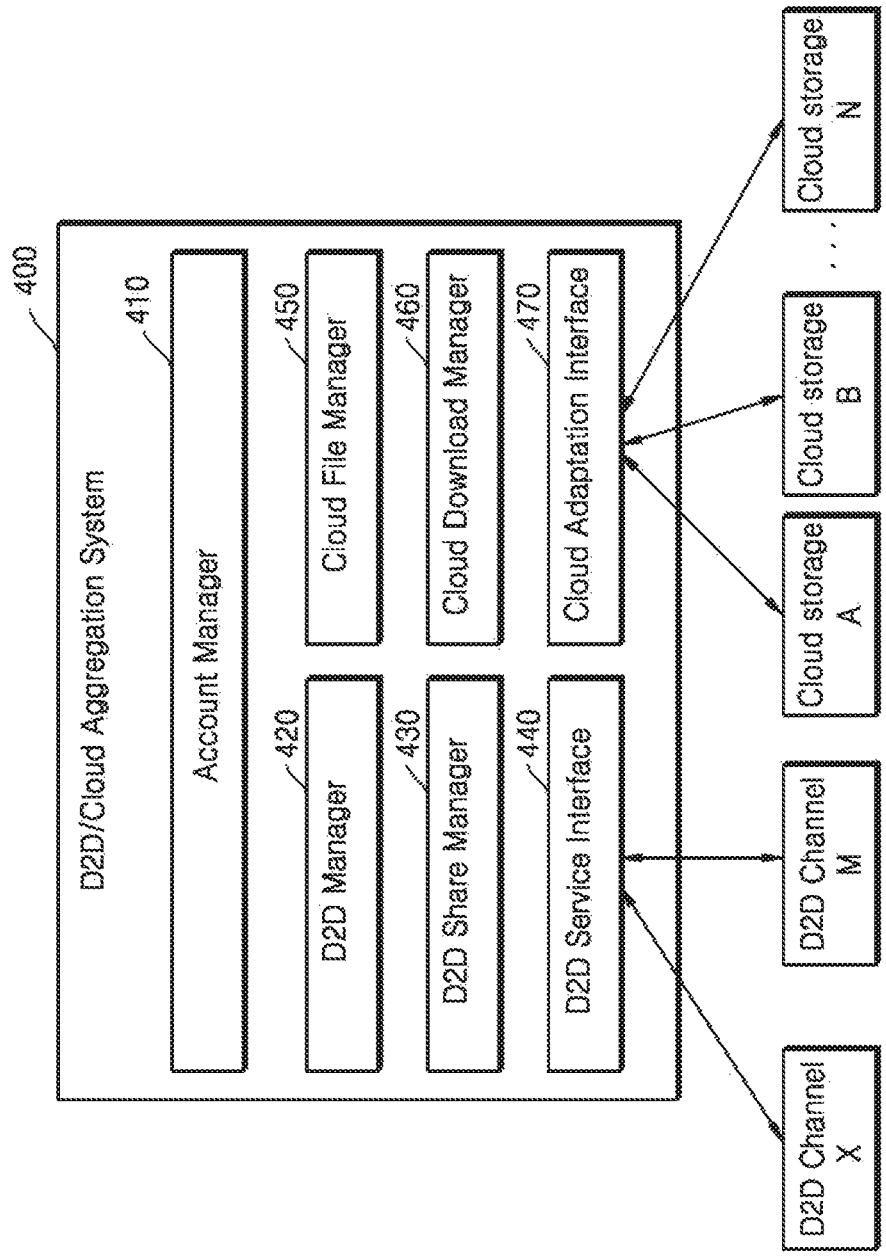
FIG. 3 is a block diagram illustrating an example device-to-device/cloud aggregation system.

FIG. 3 is a block diagram illustrating an example device-to-device (D2D)/cloud aggregation system in a user device 400.

An account manager 410 manages a user account. The user account may include information to distinguish the user account from other accounts.

A D2D manager 420 manages files stored in registered devices. The D2D manager 420 may update a list of files periodically, for example, every second, every minute, or every hour, etc. The D2D manager 420 may update the list of files when an event occurs. For example, the D2D manager 420 may update the list of files when the event, such as storing a file, deleting a file, etc., occurs.

A D2D share manager 430 is a module that transmits a file to another user device or downloads a file from another user device.

A D2D service interface 440 is a module that may abstract a D2D channel X, a D2D channel M, etc., which connects the user devices, to provide a standard interface to the user devices.

A cloud file manager 450 is a module that manages the files stored in cloud storages A through N as if the files are stored in a local storage of the user device 400.

A cloud download manger 460 is a module that downloads the file using an application programming interface (API) provided through the cloud storages A through N.

A cloud adaptation interface 470 is a module that converts different application programming interfaces (APIs) provided through the cloud storages A through N into a single standard interface and then provides the standard interface to the user devices.

Figure 4:
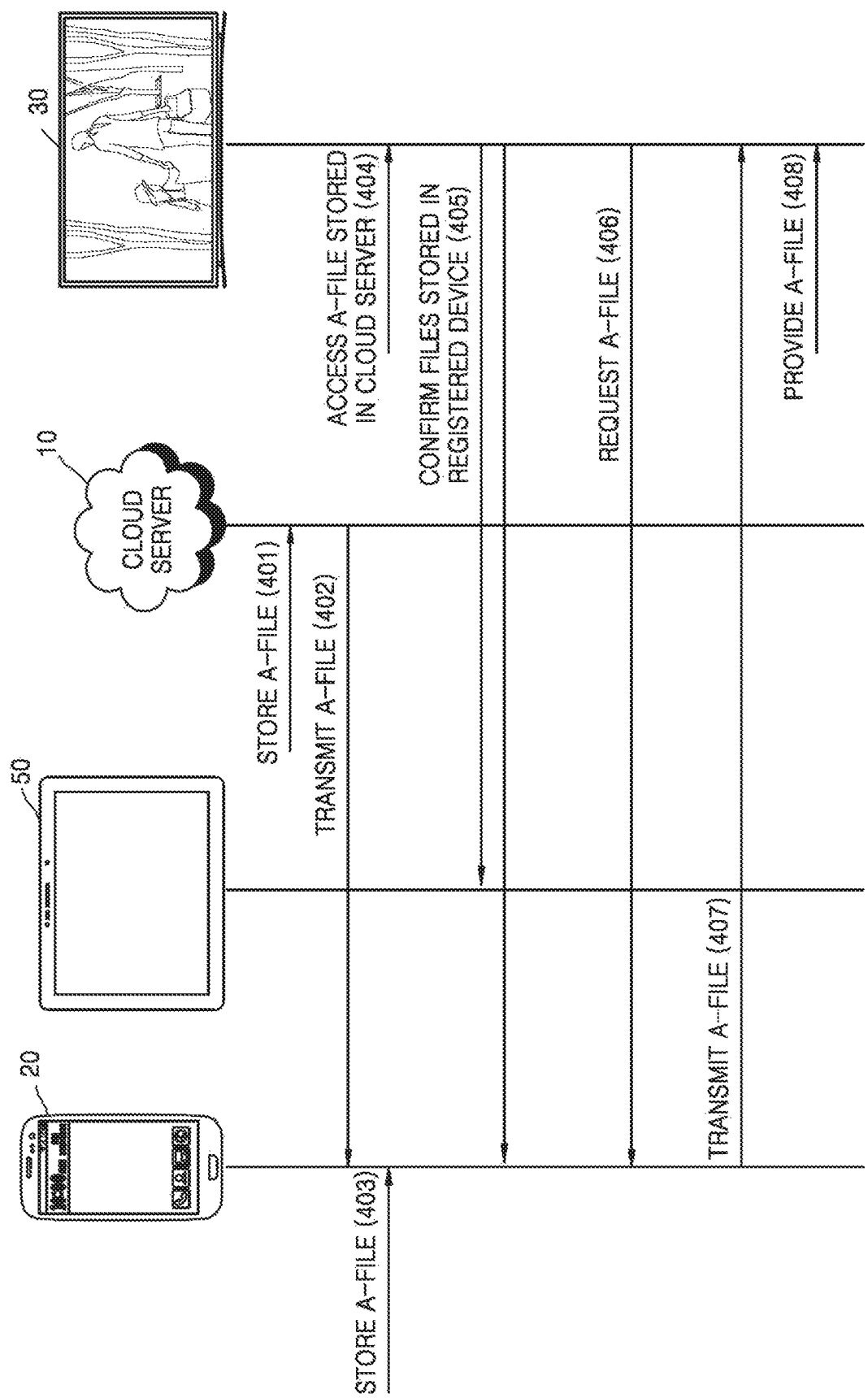
FIG. 4 is a sequence diagram illustrating an example method of downloading a file.

FIG. 4 is a sequence diagram illustrating an example method of downloading a file. Referring to FIG. 4, a TV 30 may, for example, download an A-file from a cell phone 20.

In operation 401, a cloud server 10 stores the A-file.

In operation 402, the cloud server 10 transmits the A-file to the cell phone 20.

In operation 403, the cell phone 20 stores the A-file. Accordingly, the A-file is stored in the cloud server 10 and the cell phone 20.

In operation 404, the TV 30 detects an access to the A-file stored in the cloud server 10. For example, when the A-file is a video file and a user intends to reproduce the A-file, the TV 30 determines that the user accesses the A-file.

In operation 405, the TV 30 confirms files stored in devices, for example, the cell phone 20 and a tablet 50, which are registered devices. The TV 30 is connected to a same network as the cell phone 20 and the tablet 50. The cell phone 20, the TV 30, and the tablet 50 are registered to have the same user account. Accordingly, the TV 30 confirms whether the cell phone 20 and the tablet 50 store the A-file.

In operation 406, the TV 30 requests the cell phone 20 to transmit the A-file to the TV. Since the cell phone 20 stores the same A-file as the cloud server 10 stores, the TV 30 requests the transmission of the A-file to the cell phone 20.

In operation 407, the cell phone 20 transmits the A-file to the TV 30. The TV 30 downloads the A-file.

In operation 408, the TV provides the A-file to the user. For example, if the A-file is a video file, the TV 30 may reproduce the A-file through a display unit of the TV 30.

Figure 5:
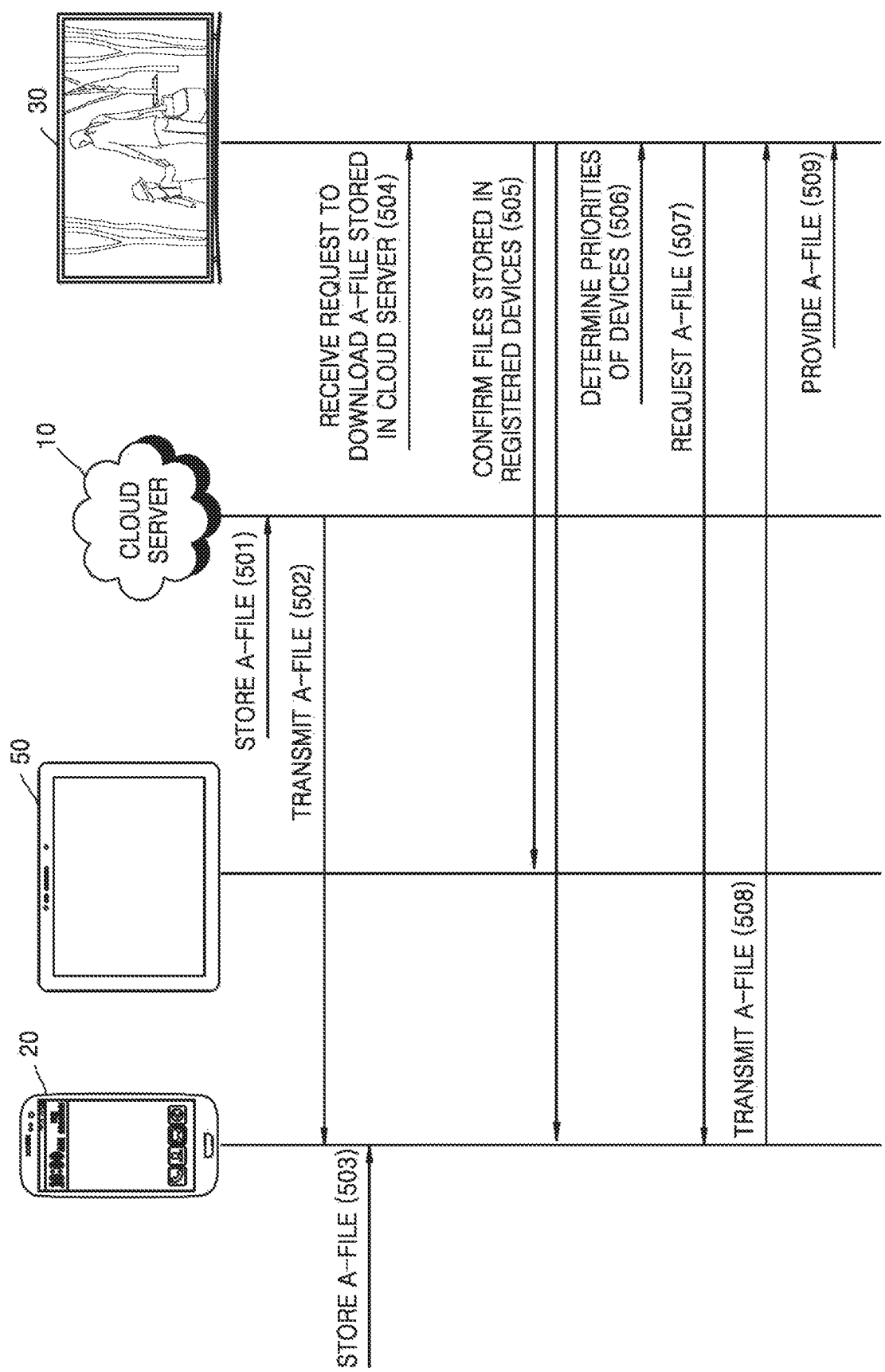
FIG. 5 is a sequence diagram illustrating an example method of downloading a file.

FIG. 5 is a sequence diagram illustrating an example method of downloading a file. Referring to FIG. 5, a TV 30 may download an A-file from a cell phone 30 based on a priority.

In operation 501, a cloud server 10 stores the A-file.

In operation 502, the cloud server 10 transmits the A-file to the cell phone 20.

In operation 503, the cell phone 20 stores the A-file. Accordingly, the A-file is stored in the cloud server 10 and the cell phone 20.

In operation 504, the TV requests the cloud server 10 to transmit the A-file to the TV 30.

In operation 505, the TV confirms files stored in devices, for example, the cell phone 20 and the tablet 50 which are registered user devices. The TV 30 is connected to the same network as the cell phone 20 and the tablet 50, and is registered to have the same user account as the cell phone 20 and the tablet 50. Accordingly, the TV 30 confirms whether the cell phone 20 and the tablet 50 store the A-file.

In operation 506, the TV 30 determines the priority of the devices. Since the A-file is stored in the cloud server 10 and the cell phone 20, the TV determines the priority of the cloud server 10 and the cell phone 20. For example, The TV 30 determines whether the A-file is downloaded from the cloud server 10 or the cell phone 20. The TV 30 may determine the device from which the A-file is downloaded based on a download time or speed. The TV 30 may determine the device from which the A-file is downloaded based on a cost for downloading the A-file. For example, the TV 30 may determine the cell phone 20 as the device with a highest priority.

In operation 507, the TV 30 requests the cell phone 20 to transmit the A-file.

In operation 508, the cell phone 20 transmits the A-file to the TV 30. The TV downloads the A-file from the cell phone 20.

In operation 509, the TV 30 provides the A-file to the user. For example, when the A-file is a video file, the TV 30 reproduces the A-file through a display unit of the TV 30.

Figure 6:
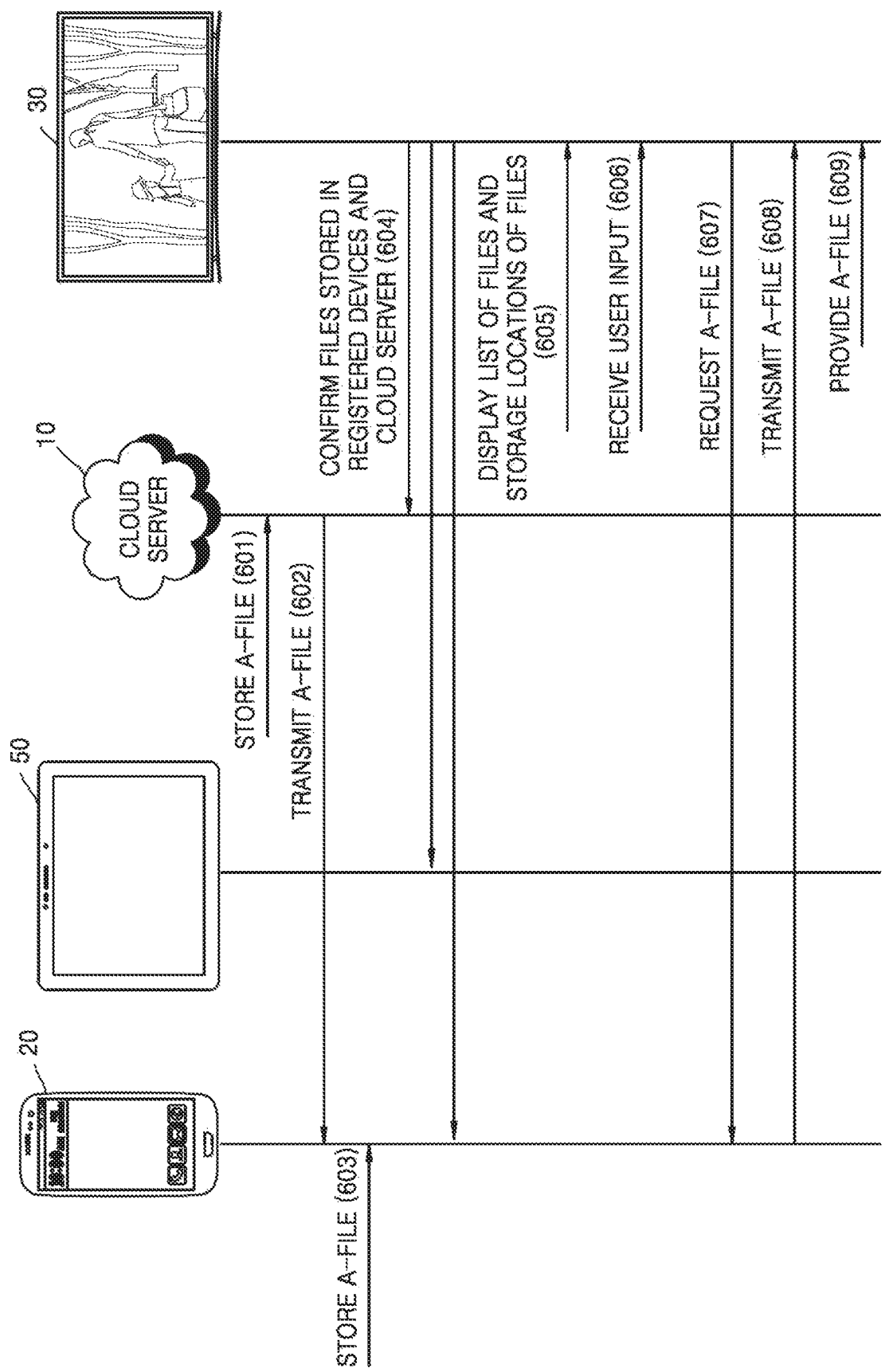
FIG. 6 is a sequence diagram illustrating an example method of downloading a file.

FIG. 6 is a sequence diagram illustrating an example method of downloading a file. Referring to FIG. 6, a TV 30 downloads an A-file from a cell phone 20 based on an input. The TV 30 may display file names together with file storage locations.

In operation 601, a cloud server 10 stores the A-file.

In operation 602, the cloud sever 10 transmits the A-file to the cell-phone 20.

In operation 603, the cell phone 20 stores the A-file. Accordingly, the A-file is stored in the cloud server 10 and the cell phone 20.

In operation 604, the TV 30 confirms files stored in devices for example, the cloud server 10 and registered devices, for example, the cell phone 20 and a tablet 50. The TV 30 may receive a file list from the cloud server 10, the cell phone 20 and the tablet 50.

In operation 605, the TV 30 displays storage locations in which the file list and the files are stored. For example, the TV 30 may display both file names and icons to display the storage locations in which the files are stored. A shape or color of the icons may vary according to the storage locations.

In operation 606, the TV 30 receives an input, for example, a user input. The TV 30 receives the user input through a user input apparatus such as a remote controller. The TV 30 determines a file and one device from which the file is downloaded based on the user input. For example, a user may select the A-file stored in the cell phone 20. The TV 30 detects selection of one icon representing a file name of the A-file and the cell phone 20.

In operation 607, the TV 30 requests the cell phone to transmit the A-file.

In operation 608, the cell phone 20 transmits the A-file to the TV 30. The TV 30 downloads the A-file from the cell phone 20.

In operation 609, the TV 30 provides the A-file to the user. For example, the TV 30 may reproduce the A-file through a display unit of the TV 30.

Figure 7:
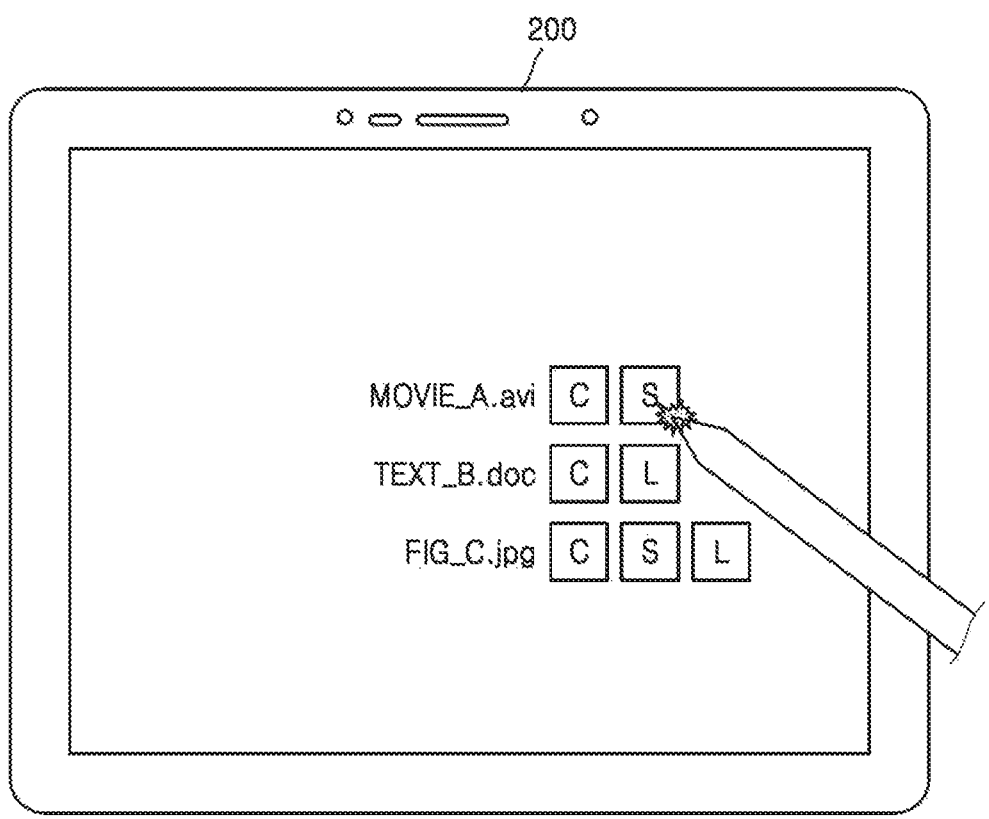
FIG. 7 is a diagram illustrating an example user interface.

FIG. 7 is a diagram illustrating an example user interface in a device 200. Referring to FIG. 7, the device 200 may display names of files and icons indicating storage locations of the files.

The icons C, S, and L displayed together with the file names MOVIE_A.avi, TEXT_B.doc, and FIG-C.jpg indicate the storage locations of the respective files. For example, C may represent a cloud server 10, S may represent a registered device, and L may represent a local storage. The local storage may be a local storage inside the device 200. The icons C, S, and L each may be selected. For example, FIG. 7 illustrates that a user selects the icon S of a file name of MOVIE_A.avi. When the icon S of a file name of MOVIE_A.avi is selected, the device 200 receives the file of MOVIE_A.avi from a registered device which stores the file of MOVIE_A.avi.

Figure 8:
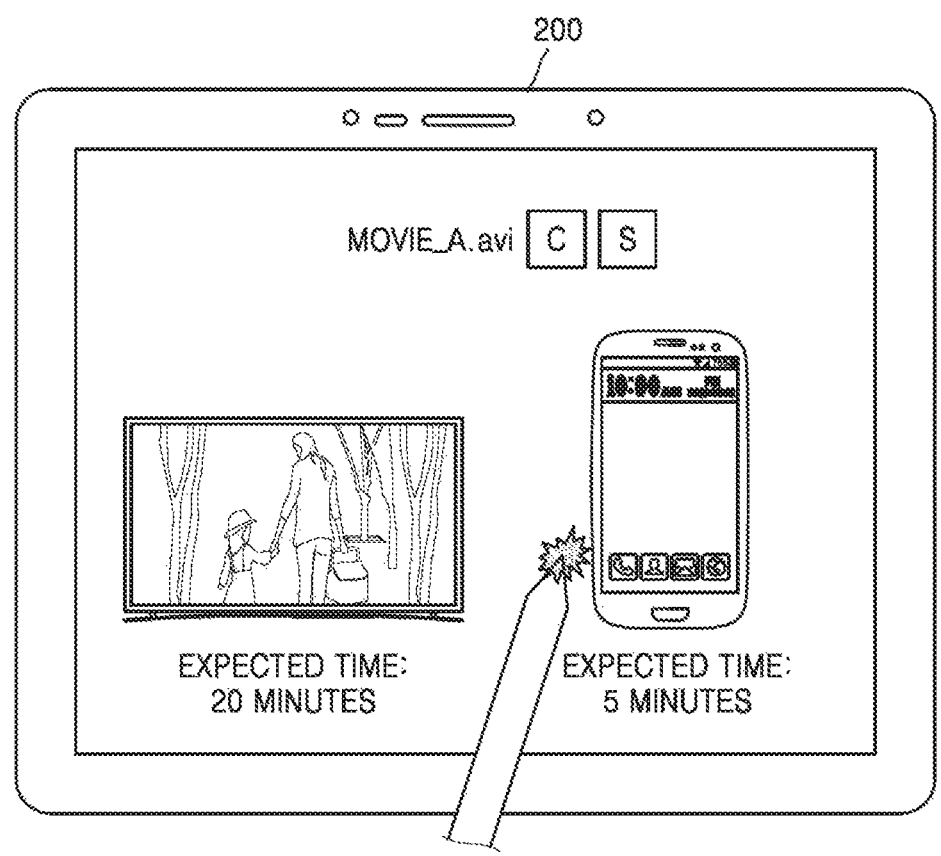
FIG. 8 is a diagram illustrating an example user interface.

FIG. 8 is a diagram illustrating an example user interface in a device 200. FIG. 8 illustrates a screen of the device 200 when an icon S of a file name of MOVIE_A.avi is selected in FIG. 7.

When a file MOVIE_A.avi is stored in a plurality of registered devices, the device 200 may display on the display unit 230 of FIG. 2 the registered devices which store the file MOVIE_A.avi. For example, when a TV 30 and a cell phone 20 store the file MOVIE_A.avi, the device 200 displays images representing the TV 30 and the cell phone 20. The device may display, for example, an expected download time to be taken to download the file MOVIE_A.avi together with the TV 30 and the cell phone 20. For example, it may take 20 minutes to download the file MOVIE_A.avi from the TV 30, and 5 minutes to download the file MOVIE_A.avi from the cell phone 20.

The device 200 may determine one registered device to download base on, for example, a user input. For example, as illustrated in FIG. 8, the user may touch the cell phone 20, and the device 200 may request the MOVIE_A.avi to the cell phone 20 and download the file MOVIE_A.avi from the cell phone 20.

Figure 9:
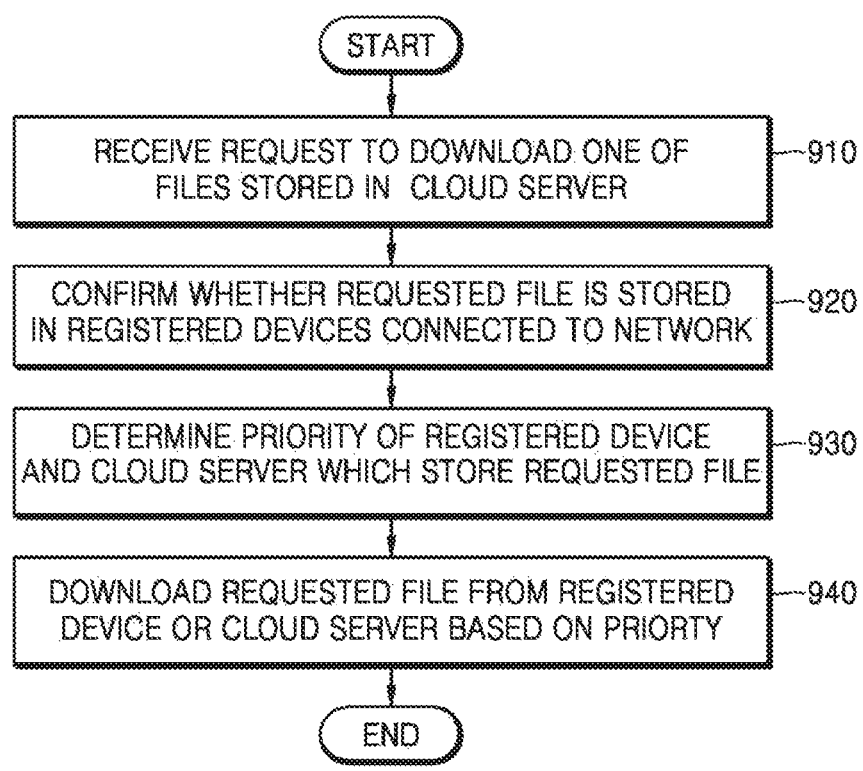
FIG. 9 is a flowchart illustrating an example method of downloading a file.

FIG. 9 is a flowchart illustrating an example method of downloading a file in a device 200. Referring to FIG. 9, the device 200 determines one device from which a file requested by a user is downloaded.

In operation 910, the device 200 receives a download request about one of files stored in a cloud server 10. The device 200 may display a list of the files stored in the cloud server 10 and determine at least one of the files to be downloaded based on a user input.

In operation 920, the device confirms whether the requested file is stored in registered devices which are connected to the same network. The device 200 confirms files stored in the registered devices and also confirms whether the registered devices store the same file stored in the cloud server 10. If the requested file is not stored in the registered devices, the device 200 downloads the requested file from the cloud server 10.

In operation 930, the device 200 determines a priority of the registered device and the cloud server 10. If the registered devices store the requested file, the device 200 determines the priority of the registered devices and the cloud server 10.

In operation 940, the device 200 downloads the requested file from one device of the registered devices and the cloud server 10 based on the priority. The device 200 requests the registered device with a highest priority to transmit the requested file.

Even when the device 200 receives a request to download the requested file stored in the cloud server 10, the device 200 may download the requested file from a registered device if the same requested file is stored in the registered device.

Figure 10:
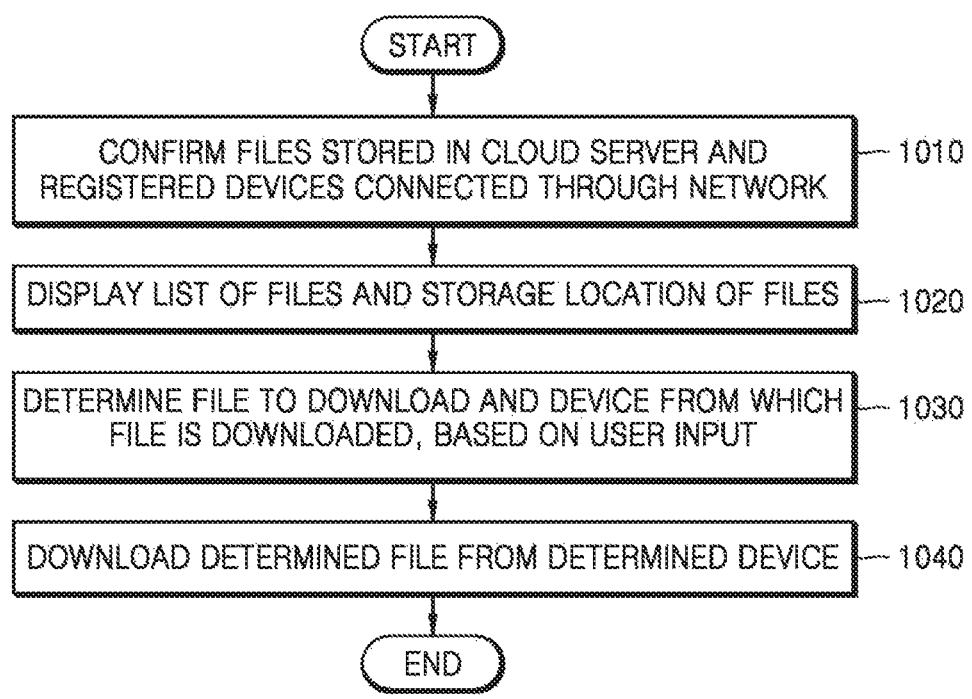
FIG. 10 is a flowchart illustrating an example method of downloading a file.

FIG. 10 is a flowchart illustrating an example method of downloading a file in a device 200. Referring to FIG. 10, the device 200 may download a file from a device determined based on a user input. The device 200 may display names of files together with storage locations of the files.

In operation 1010, the device 200 confirms files stored in a cloud server 10 and registered devices which are connected through a network. The device 200 manages the files stored in the cloud server 10 and the registered devices.

In operation 1020, the device displays a list of files and storage location of the files. The device 200 may display names of files and storage locations of the files. For example, the device 200 may display the file name and an icon representing the storage location of the file.

In operation 1030, the device 200 determines a file to download and a device from which the file is downloaded, based on the user input. The user may select one icon displayed together with the file to be downloaded. The icon may be a plurality of icons based on the storage locations of the files. The device 200 determines whether to download the file associated with to one icon selected by the user.

In operation 1040, the device downloads the determined file from the determined device.

According to an example, the device 200 may download the same file as stored in the cloud server 10 from the registered devices connected though a local network.

According to an example, the device 200 may download the file from the cloud server 10 or the registered device based on a priority.

According to an example, the device 200 may display names of files together with storage locations of the file and may determine one file to download and one device from which the file is downloaded, based on a user input.

An apparatus according to examples of the disclosure may include a processor, a memory to store and execute program data, a permanent storage such as a disk drive, a communication port to communicate with an external apparatus, and a user interface apparatus such as a touch panel, a key, a button, etc. A method realized using a software module or algorithm may be stored as computer-readable codes or program commands, which are executable in a processor, in a computer-readable storage medium. The computer-readable storage medium may include a magnetic storage medium (for example, read-only memory (ROM), random-access memory (RAM), a floppy disk, a hard disk, etc.), an optical data storage medium (for example, a compact disk ROM (CD-ROM), a digital versatile disk (DVD), etc.). The computer-readable storage medium may also be distributed over network coupled computer systems so that the computer-readable codes are stored and executed in a distribution fashion. A medium may be read by the computer, stored in the memory, and executed in the processor.

The examples may include functional blocks and various processes. The functional blocks may be realized by various numbers of hardware (e.g., circuitry) and/or software to perform particular functions. For example, the disclosure and examples may include a circuit structure, such as a memory, a processor, a logic circuit, a look-up table, etc., to perform various functions by controlling one or more microprocessors or using other controlling apparatuses. As the components of the disclosure may operate by software programming or software components, the disclosure may be realized using script language or programming, such as C, C++, Java, and assembler, and using various algorithms realized by a combination of data structure, processors, routines and other programming components. The functions may be realized by the algorithm executable in one or more processors or processing circuitry. Also the disclosure may adopt conventional art to perform data processing, signal processing, and electronic environmental setting. The terms "mechanism," "element," "means," and "structure" may be used as broad meaning and may not be limited to a mechanic or physical structure. The above terms may include a series of routines of software associated with the processor.

The processing described in the disclosure is illustrated as an example embodiment, but does not limit the scope of the disclosure. For the purpose of brevity, conventional structures, control systems, software, functions of the above systems, etc., may be omitted. Connection or connecting elements between the components illustrated in the drawings may be exemplary descriptions of functional, physical, or electrical circuit connection, may be replaceable during implementation of the disclosure, and may be represented as various functional connections, physical connections or electrical circuit connections. If there is no statement such as the term "requisite" or "important," the element may not be a requisite element to the disclosure.

As used in the claim section of the disclosure, the term "the" or a similar term to "the" may be intended to include the singular forms and/or the plural forms as well. Also, the term "range" used in the disclosure may include the respective values included in the range unless the context clearly indicates otherwise, and may be referred to the individual values within the range. Regarding operations or processes of the method of the disclosure, the operations or processes may be performed in order but may not necessarily be required to be performed in order. However, the disclosure is not limited to the operations and processes to be performed in order. In the disclosure, the usage of the illustrations or example terms (for example, et cetera or etc.) is just for convenience of explanation, and the scope of the disclosure is not limited to the illustrations or example terms unless the claims clearly indicate otherwise.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of downloading a file, performed by a first device, comprising:
    displaying a list including a plurality of files stored in a cloud server that are associated with a user account and can be downloaded by the first device;

receiving, from a user, a first user input on the displayed list for downloading a file among the plurality of files stored the cloud server;

receiving, from each of a plurality of second devices connected to the first device through a local network and registered to have the same user account as the first device for downloading the plurality of files stored in the cloud server, a file list of files stored at the each of the plurality of second devices, wherein the file list includes a list of at least one file previously received from the cloud server by the each of plurality of second devices;

identifying, according to the received first user input and based on the received file lists from the plurality of second devices, at least one second device storing the file, from the plurality of second devices, wherein the at least one second device stores the file by previously accessing the cloud server and receiving the file from the cloud server;

displaying a file name of the file and a storage location list including at least one image indicating the at least one second device and an image indicating the cloud server;

receiving, from the user, a second user input for selecting one of the cloud server and the at least one second device included in the storage location list;

in response to receive the second user input, requesting the selected one of the cloud server and the at least one second device to transmit the file; and downloading the file from the selected one of the cloud server and the at least one second device.

2. The method of claim 1, further comprising:
identifying, by a processor of the first device, the file stored in the cloud server according to the received first user input.

3. The method of claim 1, further comprising:
based on not identifying the at least one second device which stores the file, downloading the file from the cloud server.

4. A first device configured to download a file, the first device comprising:
a memory storing one or more instructions;
a display; and
a processor configured to execute the one or more instructions:
display a list including a plurality of files stored in a cloud server that are associated with a user account and can be downloaded by the first device;
receive, from a user, a first user input on the displayed list for downloading a file among the plurality of files stored in the cloud server;
receive, from each of a plurality of second devices connected to the first device through a local network and registered to have the same user account as the first device for downloading the plurality of files stored in the cloud server, a file list of files stored at the each of the plurality of second devices, wherein the file list includes a list of at least one file previously received from the cloud server by the each of the plurality of second devices;
identify, according to the received first user input and based on the received file lists from the plurality of second devices, at least one second device storing the file, from the plurality of second devices, wherein the at least one second device stores the file by previously accessing the cloud server and receiving the file from the cloud server;

display, a file name of the file and a storage location list including at least one image indicating the at least one second device and an image indicating the cloud server;

receive, from the user, a second user input for selecting one of the cloud server and the at least one second device included in the storage location list;

in response to receive the second user input, request, the selected one of the cloud server and the at least one second device to transmit the file; and download the file from the selected one of the cloud server and the at least one second device.

5. The device of claim 4, wherein the processor is further configured to:
identify, by a processor of the first device, the file stored in the cloud server according to the received first user input.

6. The device of claim 4 wherein the processor is further configured to:
based on not identifying the at least one second device which stores the file, download the file from the cloud server.

7. The method of claim 1, further comprising:
determining priorities of the cloud server and the at least one second device identified to store the file based on an expense incurred when the file is downloaded by the cloud server and the at least one second device.

8. The method of claim 1, further comprising:
determining priorities of the cloud server and the at least one second device identified to store the file based on download times which are expected to be taken to download the file from each of the cloud server and the at least one second device identified to store the file.

9. The method of claim 1, further comprising:
determining priorities of the cloud server and the at least one second device identified to store the file based on a type of communication network used to download the requested file from one of the cloud server and the at least one second device to the first device.

10. The device of claim 4, wherein the processor is further configured to determine priorities of the cloud server and the at least one second device identified to store the file based on an expense incurred when the file is downloaded by the cloud server and the at least one second device.

11. The device of claim 4, wherein the processor is further configured to determine priorities of the cloud server and the at least one second device identified to store the file based on download times which are expected to be taken to download the file from each of the cloud server and the at least one second device identified to store the file.

12. The device of claim 4, wherein the processor is further configured to determine priorities of the cloud server and the at least one second device identified to store the file based on a type of communication network used to download the requested file from one of the cloud server and the at least one second device to the first device.

13. A non-transitory computer-readable recording medium having recorded thereon computer-readable codes as a program for executing the method of claim 1.

* * * * *